(12) United States Patent
Asaad et al.

(10) Patent No.: US 7,130,963 B2
(45) Date of Patent: Oct. 31, 2006

(54) SYSTEM AND METHOD FOR INSTRUCTION MEMORY STORAGE AND PROCESSING BASED ON BACKWARDS BRANCH CONTROL INFORMATION

(75) Inventors: Sameh W. Asaad, Briarcliff Manor, NY (US); Jaime H. Moreno, Dobbs Ferry, NY (US); Jude A. Rivers, Cortlandt Manor, NY (US); John-David Wellman, Hopewell Junction, NY (US)

(73) Assignee: International Business Machines Corp., Armonk, NY (US)

( * ) Notice: Subject to any disclaimer, the term of this patent is extended or adjusted under 35 U.S.C. 154(b) by 423 days.

(21) Appl. No.: 10/620,734

(22) Filed: Jul. 16, 2003

(65) Prior Publication Data

US 2005/0015537 A1 Jan. 20, 2005

(51) Int. Cl.
*G06F 12/00* (2006.01)
(52) U.S. Cl. ........................... 711/115; 711/200
(58) Field of Classification Search ................ 711/115, 711/200
See application file for complete search history.

(56) References Cited

U.S. PATENT DOCUMENTS

| | | | | |
|---|---|---|---|---|
| 5,544,342 | A * | 8/1996 | Dean | 711/119 |
| 5,742,840 | A * | 4/1998 | Hansen et al. | 712/210 |
| 5,926,840 | A * | 7/1999 | Gold et al. | 711/169 |
| 6,205,536 | B1 * | 3/2001 | Yoshida | 712/38 |
| 6,401,196 | B1 * | 6/2002 | Lee et al. | 712/241 |
| 2002/0178350 | A1 * | 11/2002 | Chung et al. | 712/241 |
| 2004/0268047 | A1 * | 12/2004 | Dayan | 711/118 |

OTHER PUBLICATIONS

N. Bellas, I. Hajj and C. Polychronopoulus, in "A New Scheme for I-Cache Energy Reduction In High-Performance Processors," Power Driven Microarchitecture Workshop, held in conjunction with ISCA 98, Barcelona, Spain, Jun. 28, 1998.

K. Ghose and M. B. Kamble, in "Energy Efficient Cache Organizations for Superscalar Processors," Power Driven Microarchitecture Workshop, held in conjunction with ISCA 98, Barcelona, Spain, Jun. 28, 1998.

J. Kin, M. Gupta and W. Mangione-Smith, "The Filter Cache: An Energy Efficient Memory Structure," Proc. Int'l Symposium on Microarchitecture, pp. 184-193, Dec. 1997.

(Continued)

*Primary Examiner*—Matthew Kim
*Assistant Examiner*—Lev Iwashko
(74) *Attorney, Agent, or Firm*—Rafael Perez, Esq.

(57) ABSTRACT

A system for instruction memory storage and processing in a computing device having a processor, the system is based on backwards branch control information and comprises a dynamic loop buffer (DLB) which is a tagless array of data organized as a direct-mapped structure; a DLB controller having a primary memory unit partitioned into a plurality of banks for controlling the state of the instruction memory system and accepting a program counter address as an input, the DLB controller outputs distinct signals. The system further comprises an address register located in the memory of the computing device, it is a staging register for the program counter address and an instruction fetch process that takes two cycles of the processor clock; and a bank select unit for serving as a program counter address decoder to accept the program counter address and to output a bank enable signal for selecting a bank in a primary memory unit, and a decoded address for access within the selected bank.

21 Claims, 7 Drawing Sheets

OTHER PUBLICATIONS

C. Su, A. M. Despain, in "Cache Design Tradeoffs for Power and Performance Optimization: A Case Study," Proc. Int'l Symposium on Low Power Design, pp. 63-68, 1995.

L.H. Lee, W. Moyer and J. Arends, "Instruction Fetch Energy Reduction Using Loop Caches for Embedded Applications with Small Tight Loops," Proc. Int'l Symp on Low Power Design, 1999.

* cited by examiner

| ID | From - To | Condition |
|---|---|---|
| 1 | I-F | [(backward branch (bb) detected & taken) \|\| (move within loop range & entry invalid)] |
| 2a<br>2b<br>2c | F-I<br>A-I<br>O-I | [(bb not taken) \|\| (another cof causes move outside loop range)] |
| 3 | I-A | (move into loop range & entry valid) |
| 4 | F-A | [(bb is taken again) \|\| (another indented bb is taken)] & (entry valid) |
| 5 | A-F | [(resume filling rest of loop) \|\| (move within loop range & entry invalid)] |
| 6a<br>6b | F-O<br>A-O | (end of physical loop buffer reached) |
| 7 | O-A | [(cof caused within loop range) \|\| (bb detected and taken again)] & [(next_data within buffer range) & (entry valid)] |
| 8 | O-F | [(cof caused within loop range) \|\| (bb detected and taken again)] & [(next_data within buffer range) & (entry invalid)] |
| 9a<br>9b<br>9c | I-I<br>F-F<br>O-O | (no cof) |
| 10 | A-A | (no cof) & (entry valid) |

*FIG. 3b*

SYSTEM AND METHOD FOR INSTRUCTION MEMORY STORAGE AND PROCESSING BASED ON BACKWARDS BRANCH CONTROL INFORMATION

FIELD OF THE INVENTION

This invention relates to a microprocessor architecture, and more specifically, to an instruction fetch processing and storage in the microprocessor architecture.

BACKGROUND OF THE INVENTION

A memory subsystem has always been a major component in microprocessors. This contributes to both performance and energy consumption in microprocessors. Various memory structures in microprocessors, such as the register file and primary memory, while contributing positively towards bridging data latency and bandwidth gaps, consume a significant amount of energy. This energy consumption by memory structures is disproportionate, relative to other microprocessor components. In particular, the energy consumption in a memory subsystem due to instruction references is typically higher than those of data references. A typical dynamic instruction to data reference mix for the typical commercial reduced instruction set computing (RISC) industry standard architecture (ISA) is about three to one. Hence, reducing an instruction fetch energy can be critical to reducing the total energy consumed by the microprocessor.

Many emerging software applications, especially in a digital signal processing and embedded space, are loopy and/or loopy-nested in nature and are characterized by spending a large fraction of their execution times on small to medium sized program loops. Specifically, traditional embedded software applications, such as paging, fax, and gaming, as well as traditional floating-point applications, exhibit this behavior and the base of such software applications is growing.

The instruction fetch energy for these software applications can be reduced by using a small instruction buffer, often referred to as a loop buffer, to capture and manage repetitive loop streams. The loop buffer can be built out of fast, low power, loosely dense memory arrays. When instructions are captured and repetitively handled through such loop buffer, the larger primary instruction memory unit can be shutdown, leading to substantial savings in dynamic power dissipation.

The control and operation of such a loop buffer can be handled statically or dynamically through the aid of software or hardware techniques. Software approaches via the compiler, normally require profile-driven tasks to identify loop ranges of a program code and a timing of when to capture instructions into the loop buffer. Software directed approaches, and even hardware approaches, that rely on static decisions for a-priori code placement in the loop buffer before program execution, are limited in their applications and ability to reduce the fetch energy. Besides, there are issues having to do with legacy code applications that will negatively impact a new computer processor's ability to be effectively backwards compatible with a computer processor line.

The hardware technique that dynamically adjusts to program execution behavior for detecting and managing loop constructs is more portable and can see more appropriate applications. Such hardware technique requires a mechanism for dynamically identifying, capturing, and managing loops during the program execution.

Identifying loops during program execution can be accomplished in a variety of ways. For some software and hardware approaches special instructions identifying the start of a loop can be added to the ISA where detecting one of such instructions in a program will signify a start of the loop. For ISAs with no such special hint instructions, generally, a branch instruction with a backward displacement target may identify a loop where the displacement target address will be the start of the loop. One approach used to identify a loop is to monitor instructions that have been decoded for branch operation codes with negative displacement distance. Relying on this operation code monitoring approach is expensive since loop identifications can be delayed a couple of cycles because of the "wait for information" in the decode stage.

Understanding loops and loop formations is necessary for developing the necessary approach in identifying them. FIG. 1a illustrates a backwards branch instruction target used to identify a loop. For an ISA machine that executes two delayed slots following a branch, the "bct" loop body 20 in this example consists of 13 instructions $I_0$ to $I_{12}$, because the execution flow will result in instructions $I_{11}$ and $I_{12}$ as part of the loop. The instruction $I_0$, labeled "Loop_Start" and the instruction $I_{12}$, labeled "Loop_End", can be taken to define the range parameters of the "bct" loop body. For the ISA machine which does not implement delayed slots, the "bct" loop body consists of only 11 instructions, with Loop_Start being instruction $I_0$ and Loop_End being instruction $I_{10}$, which is the "bct" instruction itself.

There have been numerous attempts at reducing energy consumption in cache memory systems through the use of small instruction buffers placed between an execution pipe and a larger primary cache memory. Such attempts were described by N. Bellas, I. Hajj and C. Polychronopoulos, in "A New Scheme for I-Cache Energy Reduction In High-Performance Processors," Power Driven Microarchitecture Workshop, held in conjunction with ISCA 98, Barcelona, Spain, Jun. 28, 1998; K. Ghose and M. B. Kamble, in "Energy Efficient Cache Organizations for Superscalar Processors," Power Driven Microarchitecture Workshop, held in conjunction with ISCA 98, Barcelona, Spain, Jun. 28, 1998; J. Kin, M. Gupta and W. Mangione-Smith, "The Filter Cache: An Energy Efficient Memory Structure," Proc. Int'l Symposium on Microarchitecture, pp. 184–193, Dec. 1997; and C. Su, A. M. Despain, in "Cache Design Tradeoffs for Power and Performance Optimization: A Case Study," Proc. Int'l Symposium on Low Power Design, pp. 63–68, 1995.

Energy consumption can be minimized by not accessing the primary cache memory if the requested instructions are found in the instruction buffer. Using this general approach, however, may incur processor cycle penalties due to the instruction buffer misses. Even in situations where the primary memory is operated in the same cycle, only if there is a buffer miss, the approach stands to work at the expense of longer cycle times. These approaches fail to explicitly capture frequently and repetitively executed loops.

Lee et al. identified this problem and proposed a dynamically controlled hardware loop cache solution. See L. H. Lee, W. Moyer and J. Arends, "Instruction Fetch Energy Reduction Using Loop Caches for Embedded Applications with Small Tight Loops," Proc. Int'l Symp on Low Power Design, 1999; and L. H. Lee, J. Scott, W. Moyer and J. Arends, US patent Pending, "Data Processor System". In that solution, a loop cache controller fills the cache after detecting a simple loop defined as any short backwards branch instruction. The approach monitors a decoded instruction stream for branch instructions that have short target displacements. The fill occurs by copying the dynamic instruction stream into the loop cache. Once the fill is complete and the short backwards branch is taken again, the loop cache controller seamlessly switches instruction fetching to the loop cache, thereby logically shutting down the primary cache memory unit. The controller conservatively aborts the fill or exits the loop cache fetching if a jump is taken within the loop, since a taken jump means the entire loop may not be filled or the system is actually leaving the loop. The loop cache controller uses a simple wraparound counter for indexing into the cache and requires no tag.

While the loop cache solution reduces the average instruction fetch power, it suffers from some serious limitations. Some of the issues causing these limitations include the following:

- Some loops are not formed by a single backwards branch, in fact, loops may consist of several backwards branches, some pointing to the loop start.
- Many loops contain internal branches like the "If-Then-Else" construct.
- The loop cache controller is not capable of capturing and handling multiple nested loops of any order.
- The loop cache approach is only able to capture loops that fit fully in the loop cache.
- Any loop that is structurally longer than the size of the loop cache cannot be captured.

SUMMARY OF THE INVENTION

It is therefore an aspect of the present invention to provide an improved system and method for managing instruction buffers.

It is another aspect of the present invention to provide an improved system and method for managing instruction buffers by identifying and storing nested loops.

It is yet another aspect of the present invention to provide an improved system and method for managing instruction buffers by identifying and storing nested loops including straight-line code, "If-Then-Else" construct, and exit conditions.

It is a further aspect of the present invention to provide an improved system and method for managing instruction buffers by identifying and storing simple loop bodies and nested loops with arbitrary flow control, e.g. "If-Then-Else".

It is still another aspect of the present invention to provide an improved system and method for managing instruction buffers for power reduction in microprocessors.

To achieve these and other aspects, there is provided a system for instruction memory storage and processing in a computing device having a processor. The system is based on backwards branch control information and comprises a dynamic loop buffer (DLB) which is a tagless array of data organized as a direct-mapped structure; a DLB controller having a primary memory unit partitioned into a plurality of banks for controlling the state of the instruction memory storage system and accepting a program counter address as an input. The DLB controller outputs distinct signals. The primary memory unit may be made of static random access memory (SRAM) or dynamic random access memory (DRAM) where as the DLB is made of energy efficient material, for example, growable register arrays.

The system further comprises an address register located in the memory of the computing device, it is a staging register for the program counter address and an instruction fetch process that takes two cycles of the processor clock; and a bank select unit for serving as a program counter address decoder to accept the program counter address and to output a bank enable signal for selecting a bank in a primary memory unit, and a decoded address for access within the selected bank.

Additional elements of the inventive system include a first multiplexor for selecting amongst a plurality of banks of the primary memory unit; a second multiplexor for selecting between the DLB and the primary memory unit output; a latch for staging the data; and a data-out register located in the main memory of the computing device which receives instruction data for the processor at the decode stage.

BRIEF DESCRIPTION OF THE FIGURES

The foregoing and other objects, aspects, and advantages will be better understood from the following non-limiting detailed description of preferred embodiments of the invention with reference to the drawings that include the following:

FIG. 3b is a transition table of a preferred embodiment of the DLB controller of FIG. 3.

DETAILED DESCRIPTION OF THE INVENTION

Figure 1A:
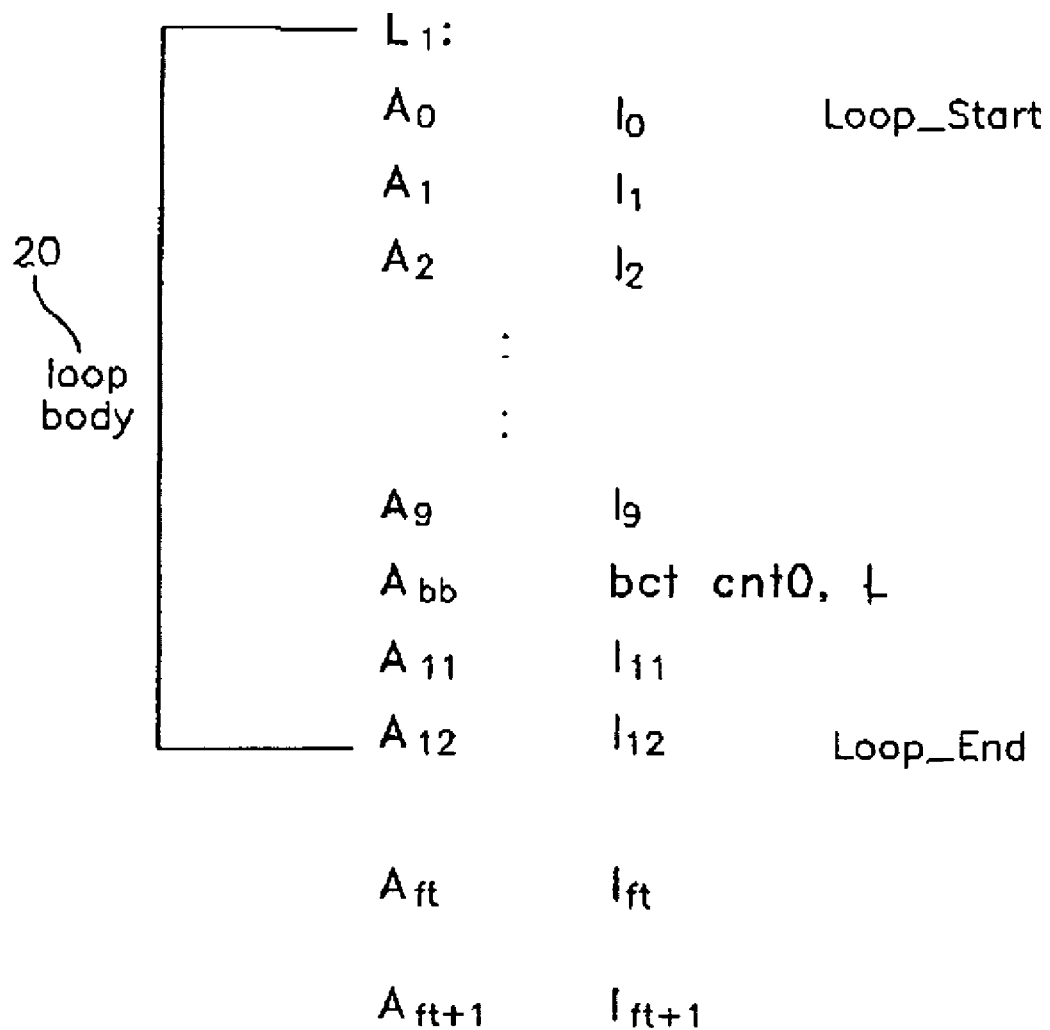
FIG. 1a is a program of instructions showing an example of straight backward loop.

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

In reducing energy consumption of a fetch instruction in microprocessor systems executing instructions in a loop, the invention uses a small instruction buffer called the dynamic loop buffer (DLB) and a supporting DLB controller. The DLB has no address tag and its contents and capacity are monitored and managed by the DLB controller. The DLB is placed in parallel with a primary instruction memory unit not in a data path. During each cycle, instructions are either supplied from the DLB or the primary memory unit to a microprocessor execution core. For each instruction request only one of two memory units is accessed while the other is shut off. This solution works for both a digital signal processing microprocessor, which uses no cache, as well as a fully pipelined microprocessor using a cache system.

The inventive use of the DLB relies on the definition, detection, and classification of a special class of backwards branch control instructions. In a general situation, all backward branch control types identified in a program can be used to trigger the DLB. In a more specialized situation, however, specific backward branch instruction types can be used to trigger the use of the DLB. The decision to choose between the general and specialized approach becomes a trade-off between desired power savings and acceptable DLB control hardware complexity.

Generally, this solution depends on monitoring capabilities of the DLB controller. On the system startup, all instruction fetch requests are made to the primary memory unit. The DLB controller monitors the instruction data sent from the primary memory unit to the microprocessor core memory. When a specific backward branch is detected and found to be taken, the DLB controller enters a FILL state. Loop identification occurs by examining a current program counter address (pc-address) against that of a previous pc-address and realizing that the current pc-address is less than the previous pc-address. In the FILL state, a copy of each data being sent from the primary memory unit to the microprocessor core is saved in the DLB. When the backward branch is found to be subsequently retaken, the DLB controller system enters an ACTIVE state. When in the ACTIVE state, the primary memory unit is logically shut down and all instruction requests are accessed from the dynamic loop buffer. When the loop exits sequentially or there is a branch taken with a target outside the scope of the loop body range, the DLB control exits the ACTIVE state and subsequent instruction requests are made to the primary memory unit.

The process of utilizing backward branch control information and a small instruction loop buffer to dynamically detect and manage frequently used loop instructions can reduce instruction fetch requests to the primary memory unit which in turn leads to lower dynamic power consumption, with no performance degradation. The present invention has the unique advantage of being able to capture different styles of nested loops, thereby contributing to a higher usage of the dynamic loop buffer. Also, the invention enjoys the flexibility of either being centrally located next to the primary memory unit or being separately located on the microprocessor core while the primary memory unit is located on a different chip as can be done with a microprocessor utilizing a flat memory.

Figure 1B:
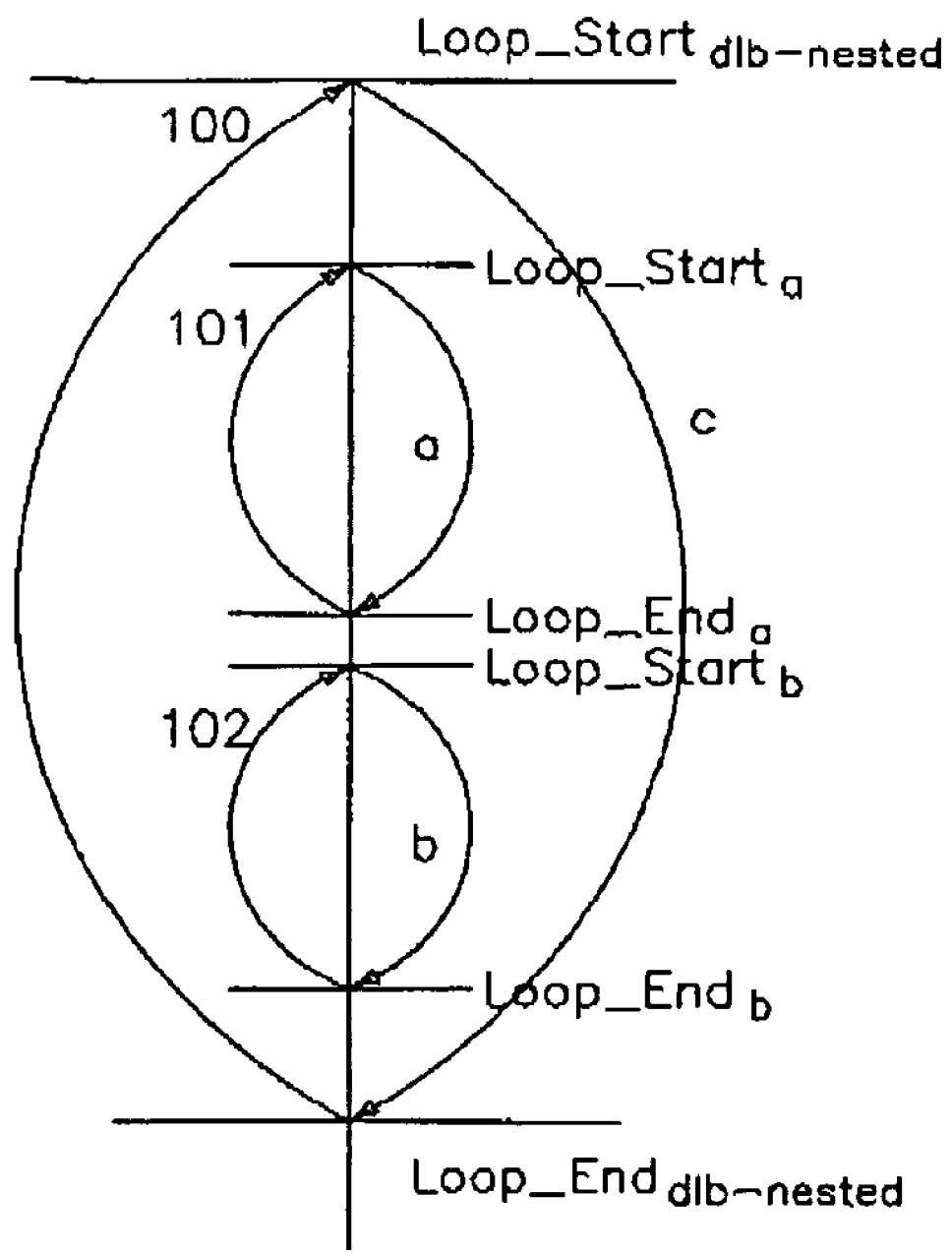
FIG. 1b is flow diagram of an exemplary nested backward loop.

Loops can generally be of various complexities and varieties, including simple straight loops, e.g., shown in FIG. 1a, and nested loops, in which case one or more loops may be embedded in a larger loop. FIG. 1b illustrates a nested loop where two simple straight loops a and b are embedded in a bigger outer loop c. A major advantage of the DLB controller is found in its ability to capture and handle both straight and nested loops of varying kinds. FIG. 1b shows an outer dlb-nested loop c 100 engulfing two inner loops a 101 and b 102. While the DLB controller is capable of capturing the bigger dlb-nested loop c 100, including both loops a 101 and b 102, the loop cache controller may at best capture only the inner loops a 101 and b 102, one at a time. Based on the sequence that the loops are accessed, this can lead to significant loop cache thrashing. The DLB controller allows for portions of a loop that is longer than the buffer to be captured and handled while sourcing off the overflows from the primary memory unit. Unlike the loop cache, the DLB controller keeps the state history and when a loop is exited and revisited, while the contents of the loop are still in the buffer, the system immediately traps into the ACTIVE state instead of reloading that data again.

A major advantage of the present invention is in the DLB controller's ability to capture and handle straight and nested loops of varying kinds. While the best most existing schemes can do is to take turns capturing the inner loops, a and b, one at a time, the DLB controller is capable of capturing the bigger dlb-nested loop c 100 with both loops a 101 and b 102 included.

Figure 2A:
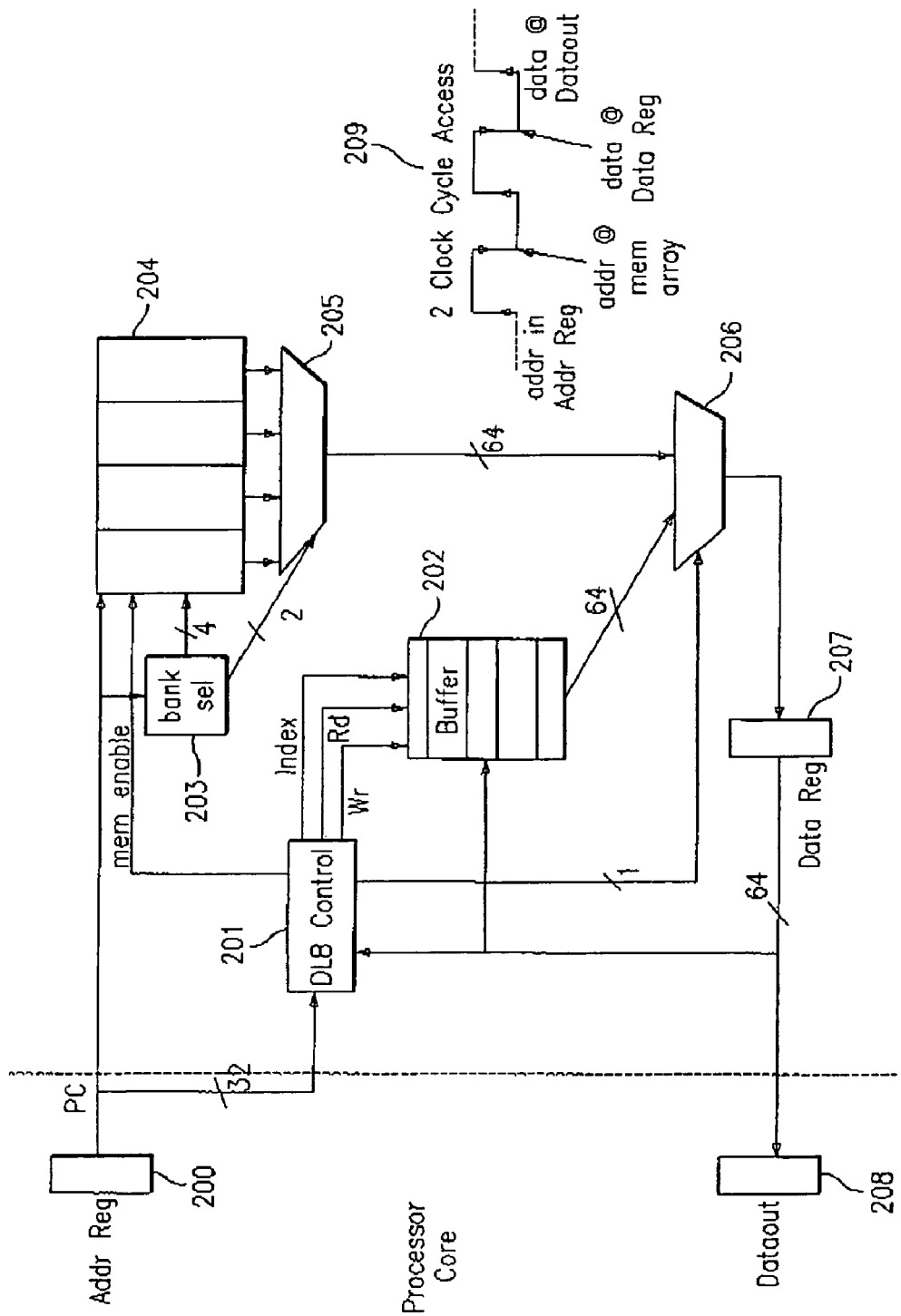
FIG. 2a is a block diagram of a flat memory structure incorporating a dynamic loop buffer (DLB) and its control of the present invention.

In one embodiment, illustrated in FIG. 2a, the present invention is shown as part of a flat memory system decoupled from the microprocessor core. The system incorporates a DLB 202 and a DLB controller 201 with a primary memory unit, not shown. The primary memory unit, assumed to be big and relatively not energy efficient with regard to the DLB, may be built of static random access memory (SRAMs) or dynamic random access memory (DRAMs) as needed. The DLB is assumed to be built out of energy efficient growable register arrays (GRAs) or ordinary register array cells, which are comparatively energy efficient.

The flat memory system of FIG. 2a includes the following components:

1) An address register 200 located in the microprocessor core memory. The address register 200 is a staging register for the pc-address.
2) The DLB controller 201 controls the state of the memory system, accepts pc-addresses as an input, and outputs distinct signals including:
   a. mem enable—enable/disable access for the primary memory unit;
   b. DLB-index—decoded address to access the DLB,
   c. Rd—enable/disable reading from the DLB,
   d. Wr—enable/disable writing to the DLB, and
   e. Mux-select—signal to multiplexor 205 to perform selection.
3) A bank select unit 203 serves as a pc-address decoder that accepts the pc-address and outputs a bank enable signal, for selecting a bank in the primary memory unit, and a decoded address for access within the selected bank.
4) The DLB 202, it accepts three input signals and includes one read or write port.
5) A primary memory unit 204 divided into four banks.
6) A multiplexor 205 for selecting amongst the banks of primary memory unit 204.
7) A multiplexor 206 for selecting between the DLB and the primary memory unit output.
8) A latch 207 for staging the data.
9) A data-out register 208, located in the core memory, receives the instruction data at the decode stage for the microprocessor.

The instruction fetch process takes two processor cycles 209, measured from a valid pc-address latched from address register 200 to valid data, for example, long instruction word (LIW) 8 bytes in length, latched into the data-out register 208. At the rising edge of every clock cycle, pc-address is latched to the DLB Controller 201 and bank select 203 from address register 200. During the first half of the clock cycle, the DLB controller 201 and the bank select unit 203 process and compute signals for the data access. On the falling edge of the clock, signals are latched at the DLB 202 and at the primary memory unit 204. The data access process is expected to take one clock cycle to complete and output data in the data register 207. At the falling edge of the clock, data from the data register 207 is latched to the data-out 208 and to the DLB 202 for storing if the system is in the FILL state.

Figure 2B:
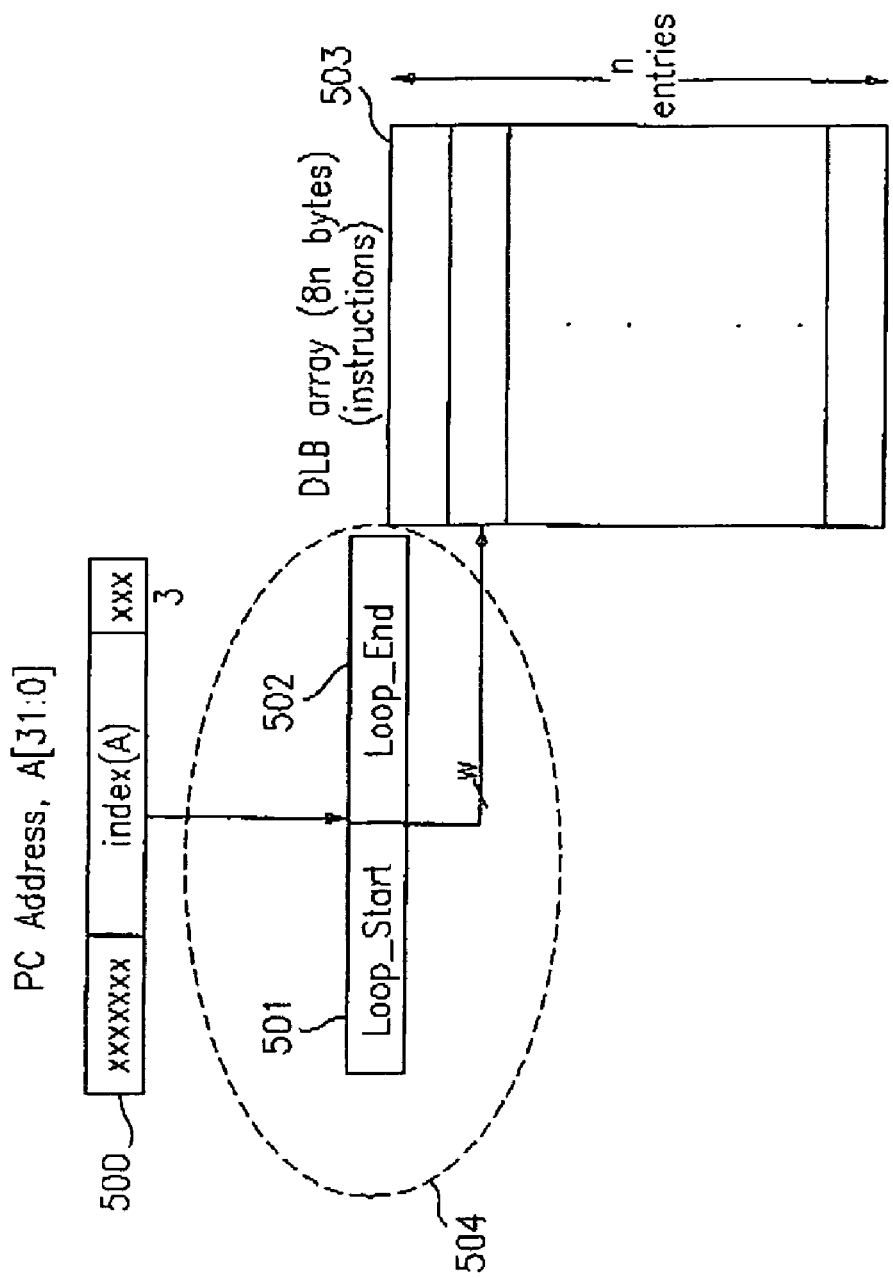
FIG. 2b is a state diagram of a preferred embodiment of the DLB structure of the present invention.

A DLB is a tagless array of data organized as a direct-mapped structure. Each entry contains a unit of instruction packet. For example, in a 32-bit PowerPC microprocessor, an instruction packet is a 32 bit, 4 byte data. In a DSP system, a unit of instruction data is a 64 bit, 8 byte LIW data. FIG. 2b illustrates an n-entry, 8n bytes, DLB 503 being accessed with an instruction address, a [31:0] 500. The buffer array is indexed by using index (A), which is generated by the DLB controller 201 (FIG. 2*a*).

Figure 3A:
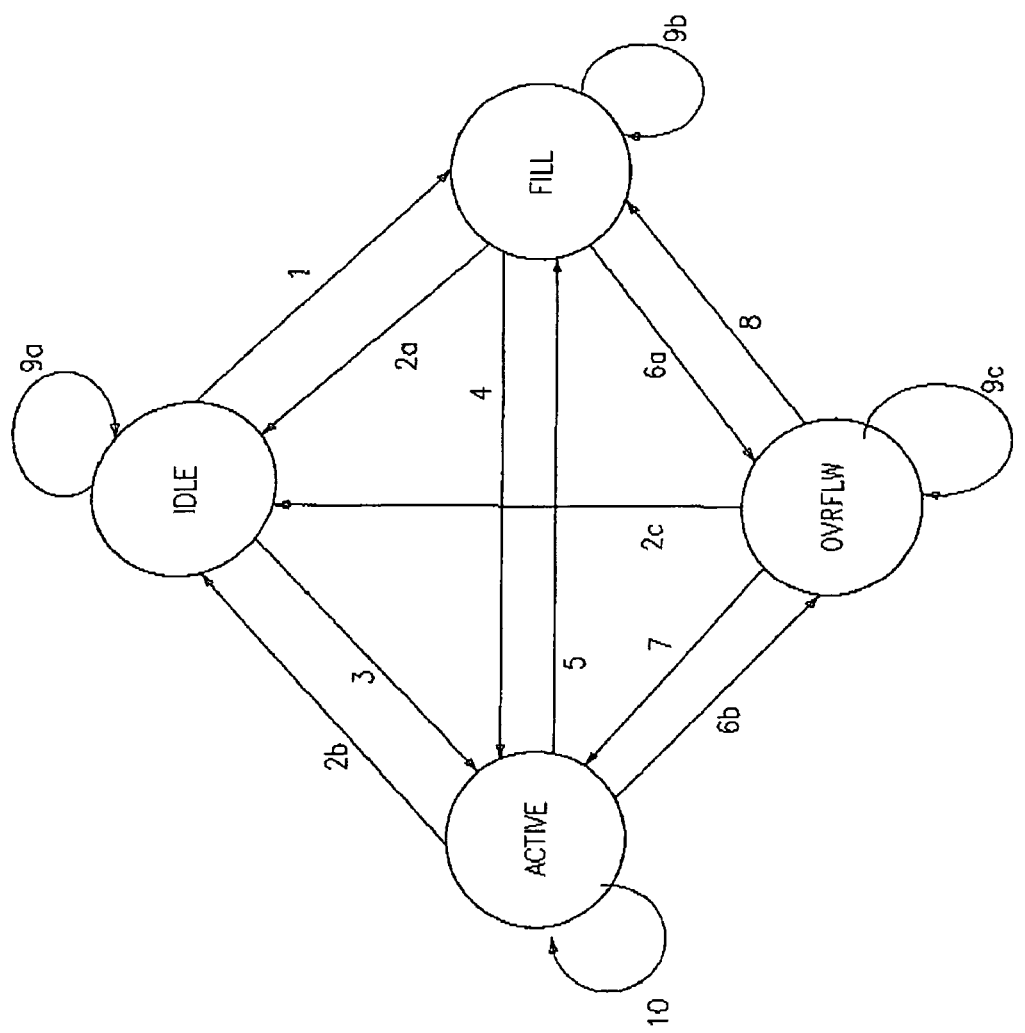
FIG. 3a is a state diagram of a preferred embodiment of the DLB controller of the present invention

FIG. 3*a* illustrates a state diagram of the DLB controller in one of four states. The states are IDLE, FILL, ACTIVE, and OVERFLOW. IDLE, FILL and ACTIVE are primary states, OVERFLOW is an auxiliary state that ensures that whenever there are loops that are longer than the size of the buffer, the portions that fit in the buffer can be handled from the buffer and the non-fitting part are handled from the primary memory unit.

Transition from one state to another by various edge events is illustrated in FIG. 3*a*, while FIG. 3*b* shows a table listing state transitions and conditions allowing these transitions. The DLB controller initially starts off in the IDLE state. It enters a FILL state via a transition path 1 upon detecting a backward branch in the instruction stream and the backward branch is later found to be taken. Detecting a backward branch can be done in one of two ways:

1) for the general backward branch case, the DLB controller compares the current pc address against the immediate previous pc address. If the current pc address is less than the previous pc address then a backward branch control has occurred; and
2) in the more special case, the controller monitors for the specific branch control types by decoding and examining the instruction data packets being sent off to the microprocessor core.

When a new backward branch loop is detected, the DLB controller sets the start of the loop, Loop_Start $I_0$ (FIG. 1*a*), and the end of the loop, Loop_end $I_{12}$ (FIG. 1*a*). When in the FILL state, a copy of the instruction packets fetched from the primary memory unit is written into the dynamic loop buffer. When a loop buffer entry is written, its valid bit is set to assert its validity. When the triggering backward branch or a backward branch within the filled up or valid portion of the loop is found to be taken, the system enters the ACTIVE state via a transition path 4. When in the FILL state, a couple of transitions will send the system back into the IDLE state via a transition path 2*a*, the triggering backward branch falls through or a branch to outside of the declared loop range. If, however, the dynamic loop buffer fills up and there is no change of flow (COF), the system enters the OVERFLOW state via a transition path 6*a*.

In the ACTIVE state, instruction fetches are presented only to the DLB. If the triggering backward branch is not taken or another change of flow branch is taken outside the loop range, the system enters the IDLE state via a transition path 2*b*. If, however, the triggering backward branch was within the loop branch, then not retaking the branch returns the system to the FILL state via a transition path 5, if the buffer is not full, or the OVERFLOW state via a transition path 6*b*, if the buffer is full, to continue refilling. Since the controller allows for internal forward jumps within the declared loop range during filling, when in the ACTIVE state the system can possibly hit an entry, which is not filled, i.e. its entry is invalid. In such a case, the controller returns into the FILL state via the transition path 5 and refills such entry. If the end of the buffer is reached while there is no COF and Loop_End $I_{12}$ (FIG. 1*a*) is not reached, the system enters the OVERFLOW state via a transition path 6*b*.

In the OVERFLOW state, instruction data packets are read from the primary memory unit and no data is written into the dynamic loop buffer. From the OVERFLOW state, a jump and/or a branch to outside of the declared loop range will return the system to the IDLE state via a transition path 2*c*. If the triggering backward branch is taken, the system will return to the ACTIVE state via the transition path 7. If a backward branch within the loop is taken and the corresponding data is within the buffer range, the system goes into the ACTIVE state via the transition path 7, if the entry is valid, or the FILL state via a transition path 8, if the entry is invalid.

In the IDLE state, instruction data packets are accessed from the primary memory unit. If a new backward branch is detected, the system enters the FILL state via the transition path 1. If the last loop captured in the dynamic loop buffer is revisited, the DLB controller moves into ACTIVE state via a transition path 3.

When the system is in any of the four states, and there is no COF, waiting paths 9*a* for IDLE, 9*b* for FILL, 9C for OVERFLOW, and 10 for ACTIVE state are taken. For the ACTIVE state, path 10 is also taken when the entry is valid. A table organized by the number of paths taken from state to state, lists the direction of the path, e.g., I-F or IDLE to FILL and the condition for which the path is taken, is presented in FIG. 3*b*.

Figure 4:
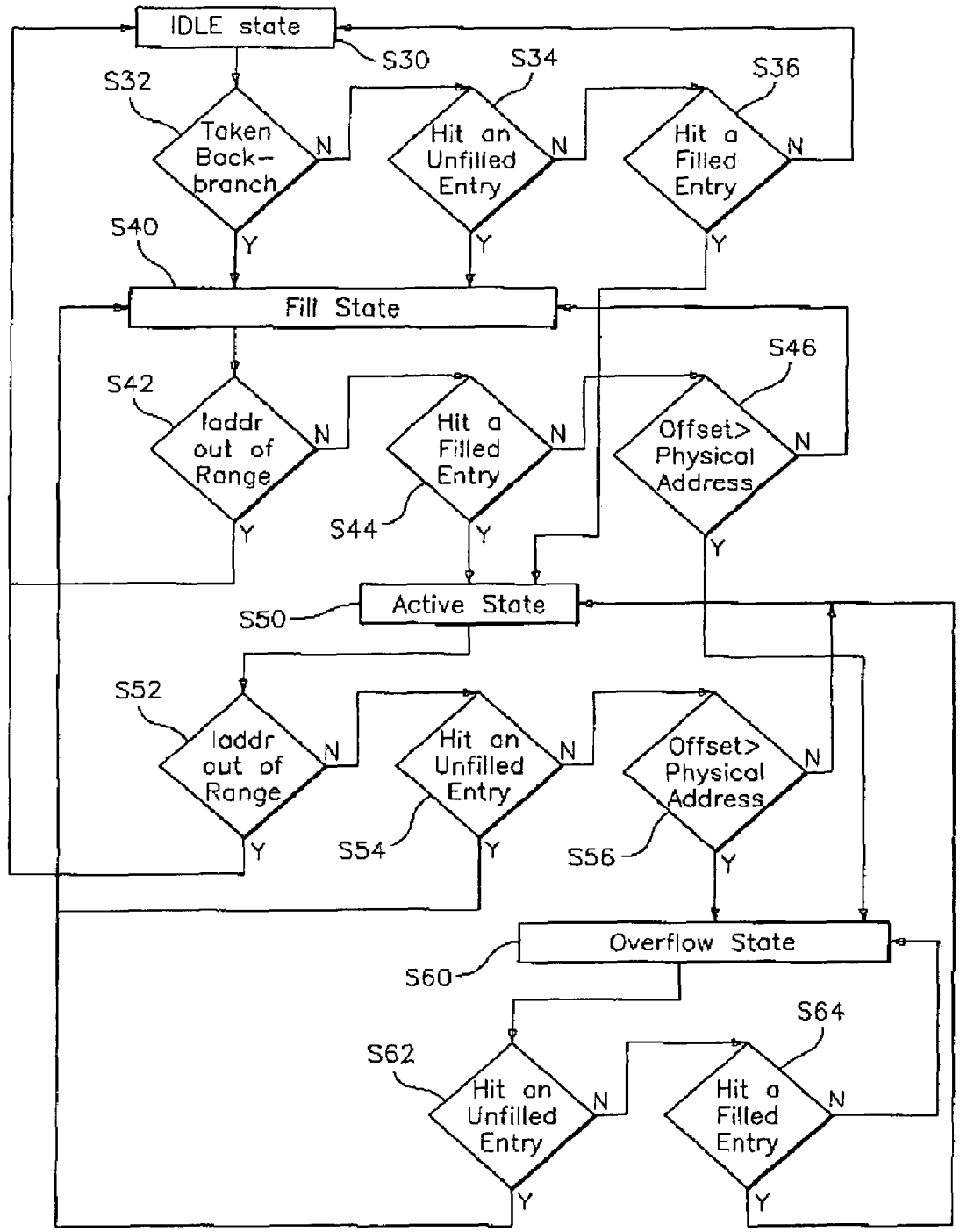
FIG. 4 is a state transition flow chart of the preferred embodiment of the DLB controller of FIGS. 3a and 3b.

A flowchart of state transitions of the DLB controller is shown in FIG. 4. From its initial IDLE state S30 the DLB controller enters step S32 and determines if a back branch was taken. If the determination is positive, then the DLB controller enters the FILL state step S40, otherwise, it enters step S34 and determines if an unfilled entry was hit. If the determination is positive, then the DLB controller enters the FILL state step S40, otherwise, it enters step S36 and determines if a filled entry was hit. If the determination is positive, then the DLB controller enters the ACTIVE state step S50, otherwise, it returns to the IDLE state step S30.

From the FILL state S40 the DLB controller enters step S42 and determines if an address is out of range. If the determination is positive, then the DLB controller returns to the IDLE state step S30, otherwise, it enters step S44 and determines if an filled entry was hit. If the determination is positive, then the DLB controller enters the ACTIVE state step S50, otherwise, it enters step S46 and determines if an offset is greater than a physical address. If the determination is positive, then the DLB controller enters the OVERFLOW state step S60, otherwise, it returns to the FILL state step S40.

From the ACTIVE state S50 the DLB controller enters step S52 and determines if the address is out of range. If the determination is positive, then the DLB controller returns to the IDLE state step S30, otherwise, it enters step S54 and determines if an unfilled entry was hit. If the determination is positive, then the DLB controller enters the FILL state step S40, otherwise, it enters step S56 and determines if the offset is greater than the physical address. If the determination is positive, then the DLB controller enters the OVERFLOW state step S60, otherwise, it returns to the ACTIVE state step S50.

From the OVERFLOW state S60 the DLB controller enters step S62 and determines if an unfilled entry was hit. If the determination is positive, then the DLB controller returns to the FILL state step S40, otherwise, it enters step S64 and determines if a filled entry was hit. If the determination is positive, then the DLB controller returns to the ACTIVE state step S50, otherwise, it returns to the OVERFLOW state step S60.

Even though the described embodiment has been presented as part of a flat memory system, this invention maps equally well in a system that incorporates a level one cache memory. Those skilled in the art can, without undue experimentation, extend this invention to a cache system. The level one cache memory becomes the primary memory unit and the DLB controller can be absorbed as part of the primary cache controller, where it is put first in series with the cache lookup. In that scenario, the DLB controller is probed first for an access to the loop buffer before a tag lookup in the cache is allowed to go forward.

What has been described herein is merely illustrative of the application of the principles of the present invention. For example, the functions described above and implemented as the best mode for operating the present invention are for illustration purposes only. Other arrangements and methods may be implemented by those skilled in the art without departing from the scope and spirit of this invention.

We claim:

1. A system for instruction memory storage and processing in a computing device having a processor, the system being based on backwards branch control information, the system comprising:
   a dynamic loop buffer (DLB) organized as a direct-mapped structure, said DLB being a tagless array of data;
   a DLB controller having a primary memory unit partitioned into a plurality of banks, wherein said controller controls the stale of the instruction memory storage system, accepts a program counter address (pc address) as an input, and outputs distinct signals;
   an address register located in the memory of said computing device, wherein said address register is a staging register for said program counter address, and an instruction fetch process takes two cycles of said processor; and
   a bank select unit for serving as a pc-address decoder to accept the program counter address and to output a bank enable signal for selecting a bank in a primary memory unit, and a decoded address for access within the selected bank, wherein the system is configured to:
   fetch instruction packets from the primary memory unit,
   write a copy of said instruction packets into the DLB,
   set a valid bit to assert validity of said DLB,
   enter an ACTIVE state when a backward branch is taken within a range of a loop,
   enter an IDLE state when said backward branch completes a loop and a change of flow branch is taken out of range of said loop, and
   enter an OVERFLOW state if the DLB fills up and said change of flow branch is not taken; and
   if in the IDLE state, enter the ACTIVE state if a last loop captured in the DLB is repeated.

2. The system of claim 1, further comprising:
   a first multiplexor for selecting amongst a plurality of banks of said primary memory unit;
   a second multiplexor for selecting between the DLB and the primary memory unit output;
   a latch for staging the data; and
   a data-out register located in the main memory of said computing device, wherein said data-out register receives instruction data for said processor at the decode stage.

3. The system of claim 1, wherein said primary memory unit is one of a static random access memory (SRAM) or a dynamic random access memory (DRAM).

4. The system of claim 1, wherein said DLB is made of energy efficient growable register arrays (GRAS).

5. The system of claim 1, wherein said DLB is made of energy efficient register array cells.

6. The system of claim 2, wherein said distinct signals output from said DLB controller include:
   signals to enable/disable said processor to access said primary memory unit, to read the DLB and to write the DLB;
   decoded address signals for said processor to access said DLB; and
   select signals to select a first multiplexor.

7. The system of claim 1, wherein said DLB further includes a read or write port and accepts three input signals.

8. A method of instruction memory storage and processing in a computing device having a processor, a dynamic loop buffer (DLB), and a DLB controller, the method being based on backwards branch control information, the method comprising the steps of:
   measuring cycles from a valid program counter address latched from an address register to valid data;
   latching said program counter address said DLB controller and a bank select unit from said address register at a rising edge of every clock cycle;
   said DLB controller and said bank select unit processing signals for data access during a first half of the clock cycle;
   latching signals at the DLB and at a primary memory unit on the falling edge of the clock cycle;
   completing and output data in a data register in one clock cycle;
   fetching instruction packets from the primary memory unit,
   writing a copy of said instruction packets into the DLB,
   setting a valid bit to assert validity of said DLB,
   entering an ACTIVE state when a backward branch is taken within a range of a loop,
   entering an IDLE state when said backward branch completes a loop and a chance of flow branch is taken out of range of said loop:
   entering an OVERFLOW state if the DLB fills up and said change of flow branch is not taken; and
   if in the IDLE state, entering the ACTIVE state if a last loop captured in the DLB is repeated.

9. A method of claim 8, further comprising a step of latching data from a data register to a data-out and to the DLB for storing at the falling edge of the clock, when said controller is in a FILL state.

10. An instruction buffer managing system in a computing system including a processor, said system comprising:
   an instruction address input for receiving one or more program counter values from said processor;
   a controllable path between the instruction address input and an instruction address output that passes program counter values to an instruction memory, the instruction memory being connected to the instruction address output, wherein said program counter values received at the instruction address input are monitored;
   a controller for defining a range of instructions, the range of instructions comprising a loop; and
   a filler for filling a buffer with each instruction of a range in a first pass, except for at least one unfilled instruction, wherein the program counter values on one or more subsequent loop iterations are continuously monitored until an unfilled instruction is encountered and a buffer manager provides said unfilled instruction, wherein the system is configured to:
   fetch instruction packets from a primary memory unit,
   write a coney of said instruction packets into the buffer,
   set a valid bit to assert validity of said buffer,
   enter an ACTIVE state when a backward branch is taken within a range of a loop, enter an IDLE state when said backward branch completes a loop and a change of flow branch is taken out of range of said loop, and
enter an OVERFLOW state if the buffer fills up and said change of flow branch is not taken; and
if in the IDLE state, enter the ACTIVE state if a last loop captured in the buffer is repeated.

11. A system of claim 10, wherein said unfilled instructions are within a sub range defined by a forward non-consecutive control flow instruction.

12. A system of claim 10, wherein said unfilled instructions are within a sub range defined by a backward non-consecutive control flow instruction.

13. A system of claim 10, wherein an instruction address of said unfilled instructions fall outside a sequential address associated with the buffer and are therefore omitted.

14. A system of claim 13, wherein the buffer manager takes unfilled instruction from the instruction memory.

15. A system of claim 10, wherein instructions in the buffer are retained after the processor fetches instructions outside the range.

16. A method of changing states of a dynamic loop buffer (DLB) controller having four states, to enable limiting a use of energy in a computing device having a processor, a DLR, and the DLB controller, while said computing device is performing instruction memory storage and processing using backwards branch control information, the method comprising the steps of:
in an initial IDLE state, determining if a back branch was taken;
entering a FILL state if the determination is positive, and if the determination is negative, determining if an unfilled entry was hit;
entering the FILL state if the determination is positive, and if the determination is negative, determining if a filled entry was hit; and
entering an ACTIVE state if the determination is positive, if the determination is negative, returning to the IDLE state; and
if in the IDLE state, enter the ACTIVE state if a last loop captured in the DLB is repeated.

17. The method of claim 16, further comprising the steps of:
in the FILL state, determining if an address is out of range;
entering the IDLE state if the determination is positive, and if the determination is negative, determining if a filled entry was hit,
entering the ACTIVE state if the determination is positive, if the determination is negative, determining if an offset is greater than a physical address; and
entering an OVERFLOW state if The determination is positive, if the determination is negative returning to the FILL state.

18. The method of claim 17, further comprising the steps of:
in the ACTIVE state determining if the address is out of range;
entering the IDLE state if the determination is positive, and if the determination is negative, determining if an unfilled entry was hit; and
entering the FILL, state if the determination is positive, and if the determination is negative, determining if an offset is greater than a physical address; and
entering the OVERFLOW state if the determination is positive, and if the determination is negative returning to the ACTIVE state.

19. The method of claim 17, further comprising the steps of:
in the OVERFLOW state, determining if an unfilled entry was hit;
entering an FILL state if the determination is positive, and if the determination is negative, determining if a filled entry was hit; and
entering the ACTIVE state if the determination is positive, and if the determination is negative, returning to the OVERFLOW state.

20. A method of changing states of a dynamic loop buffer (DLB) controller having four states, to enable limiting a use of energy in a computing device having a processor, a DLB, and the DLB controller, while said computing device is performing instruction memory storage and processing using backwards branch control information, the method comprising the steps of:
in a FILL state
fetching instruction packets from a primary memory unit,
writing a copy of said instruction packets into a DLB,
setting a valid bit to assert validity of said DLB,
entering an ACTIVE state when a backward branch is taken within a range of a loop,
entering an IDLE state when said backward branch completes a loop and a
change of flow branch is taken out of range of said loop, and
entering an OVERFLOW state if the DLB fills up and said change of flow branch is not taken;
in the ACTIVE state
presenting instruction fetches to the DLB,
entering the IDLE state if said backward branch is not taken and a change of flow branch is taken out of range,
entering the FILL state if the buffer is not full, if said backward branch is within the loop,
entering an OVERFLOW state if the buffer is full,
entering the FILL state if the buffer is full, and
entering the OVERFLOW state if the end of the buffer is reached said and change of flow branch is not taken;
in The OVERFLOW state
reading instruction data packets from a primary memory unit of said computing device,
entering the IDLE state after performing a jump or a branch instruction out of range of said loop;
entering the ACTIVE state if said backward branch is taken,
entering the ACTIVE state if a backward branch within the range of said loop is taken and data is valid, and
entering the FILL state if a backward branch within the range of said loop is taken and data is invalid; and
in the IDLE state
accessing instruction data packets from the primary memory unit, entering the FILL state if a new backward branch is detected, and
entering the ACTIVE state if a last loop captured in the dynamic loop buffer is repeated.

21. A computer program device readable by a machine, tangibly embodying a program of instructions executable by the machine to perform method steps for a method of changing states of a dynamic loop buffer (DLB) controller having four states, to enable limiting a use of energy in a computing device having a processor, a DLB, and the DLB controller, while said computing device is performing instruction memory storage and processing using backwards branch control information, the method comprising the steps of:

in a FILL state
fetching instruction packets from a primary memory unit,
writing a copy of said instruction packets into a DLB,
setting a valid bit to assert validity of said DLB,
entering an ACTIVE state when a backward branch is taken within a range of a loop,
entering an IDLE state when said backward branch completes a loop and a change of flow branch is taken out of range of said loop, and
entering an OVERFLOW state if the DLB fills up and said change of flow branch is not taken;

in the ACTIVE state
presenting instruction fetches to the DLB,
entering the IDLE state if said backward branch is not taken and a change of flow branch is taken out of range,
entering the FILL state if the buffer is not full, it said backward branch is within the loop,
entering an OVERFLOW state if the buffer is full,
entering the FILL state if the buffer is full, and
entering the OVERFLOW state if the end of the buffer is reached said and change of flow branch is not taken;

in the OVERFLOW state
reading instruction data packets from a primary memory unit of said computing device,
entering the IDLE state after performing a jump or a branch instruction out of range of said loop;
entering the ACTIVE state if said backward branch is taken,
entering The ACTIVE state if a backward branch within the range of said loop is taken and data is valid, and
entering the FILL state if a backward branch within the range of said loop is taken and data is invalid; and in the IDLE state
accessing instruction data packets from the primary memory unit,
entering the FILL state if a new backward branch is detected, and
entering the ACTIVE state if a last loop captured in the dynamic loop buffer is repeated.

* * * * *